United States Patent Office 3,031,505
Patented Apr. 24, 1962

3,031,505
AMINE-EPIHALOHYDRIN-ALKYLENE POLY-AMINE REACTION PRODUCT
Ernest L. Pollitzer, Hinsdale, Ill., assignor, by mesne assignments, to Universal Oil Products Company, Chicago, Ill., a corporation of Delaware
No Drawing. Filed Dec. 3, 1958, Ser. No. 777,836
6 Claims. (Cl. 260—584)

This application is a continuation-in-part of my copending and now abandoned application Serial No. 712,314, filed January 31, 1958, which, in turn, is a continuation-in-part of application Serial No. 647,200, filed March 20, 1957, and relates to a novel reaction product and the manufacture thereof.

In one embodiment the present invention relates to the reaction product of an amino compound having at least 12 carbon atoms and a straight chain of at least 3 carbon atoms attached to a nitrogen atom, with an epihalohydrin compound, and subsequently reacting the same with an alkylene polyamine.

In a specific embodiment the present invention relates to the reaction product formed by reacting tallow amine with epichlorohydrin and then reacting with ethylene diamine.

It is essential in the present invention that the amine compound used in preparing the reaction product contains at least 12 carbon atoms and preferably at least 15 carbon atoms. Generally the total number of carbon atoms in the amine will not exceed about 40 carbon atoms per molecule. Reaction products prepared from amines containing less than 12 carbon atoms are not satisfactory for certain uses of the reaction products of the present invention as, for example, an additive in burner oil, and therefore are not suitable for use in the present invention. Furthermore, the amine must contain a straight chain of at least 3 carbon atoms attached to a primary or secondary amino nitrogen. In other words, the alkyl group attached to the nitrogen atom is of normal configuration and not secondary, tertiary, or of cyclic configuration. However, the alkyl group may contain branching in the chain provided such branching occurs on the fourth carbon atom from the nitrogen atom or further distant therefrom.

Any suitable alkyl amine meeting the requirements set forth may be used in preparing the additive of the present invention. In addition to the above requirements, it is essential that the alkyl amine is a primary or secondary amine, that is, only 1 or 2 of the hydrogen atoms attached to a nitrogen atom are substituted by alkyl groups. Tertiary amines (no hydrogen atoms attached to the nitrogen atom) cannot be used in the present invention. It is understood that the term "alkyl amine" is used in the present specifications and claims to include primary alkyl amines, secondary alkyl amines, polyamines, N-alkyl polyamines, N,N'-dialkyl polyamines, etc., all of which also meet the other requirements hereinbefore set forth.

Illustrative examples of primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing 16 to 18 carbon atoms per alkyl group, although they contain a small amount of alkyl groups having 14 carbon atoms, and also meet the other requirements hereinbefore set forth.

Illustrative examples of secondary amines include di(dodecyl) amine, di(tridecyl) amine, di(tetradecyl) amine, di(pentadecyl) amine, di(hexadecyl) amine, di(heptadecyl) amine, di(octadecyl) amine, di(nonadecyl) amine, di(eicosyl) amine, etc. In these examples each of the alkyl substituents contains a straight chain of at least 3 carbon atoms attached to the nitrogen atom. In another embodiment, which is not necessarily equivalent, the secondary amine will contain 1 alkyl group having at least 12 carbon atoms and another chain having less than 12 carbon atoms, both of the alkyl groups having a straight chain of at least 3 carbon atoms attached to the nitrogen atom. Illustrative examples of such compounds include N-propyl-dodecyl amine, N-butyl-dodecyl amine, N-amyl-dodecyl amine, etc., N-butyl-tridecyl amine, N-amyl-tridecyl amine, etc., N-propyl-tetradecyl amine, N-butyl-tetradecyl amine, N-amyl-tetradecyl amine, etc. Here again, mixtures of secondary amines are available commercially, usually at a lower price, and such mixtures may be used in accordance with the present invention, provided that the amines meet the requirements hereinbefore set forth. An example of such a mixture available commercially is "Armeen 2HT" which consists primarily of dioctadecyl amine and dihexadecyl amine.

Preferred examples of N-alkyl polyamines comprise N-alkyl-1,3-diaminopropanes in which the alkyl group contains at least 12 carbon atoms and a straight chain of at least 3 carbon atoms attached to the nitrogen atom. Illustrative examples include N-dodecyl-1,3-diaminopropane,
N-tridecyl-1,3-diaminopropane,
N-tetradecyl-1,3-diaminopropane,
N-pentadecyl-1,3-diaminopropane,
N-hexadecyl-1,3-diaminopropane,
N-heptadecyl-1,3-diaminopropane,
N-octadecyl-1,3-diaminopropane,
N-nonadecyl-1,3-diaminopropane,
N-eicosyl-1,3-diaminopropane,
N-heneicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane,
N-hexacosyl-1,3-diaminopropane,
N-heptacosyl-1,3-diaminopropane,
N-octacosyl-1,3-diaminopropane,
N-nonacosyl-1,3-diaminopropane,
N-triacontyl-1,3-diaminopropane,
N-hentriacontyl-1,3-diaminopropane,
N-dotriacontyl-1,3-diaminopropane,
N-tritriacontyl-1,3-diaminopropane,
N-tetratriacontyl-1,3-diaminopropane,
N-pentatriacontyl-1,3-diaminopropane,
N-hexatriacontyl-1,3-diaminopropane,
N-heptatriacontyl-1,3-diaminopropane,
N-octatriacontyl-1,3-diaminopropane,
N-nonatriacontyl-1,3-diaminopropane,
N-tetracontyl-1,3-diaminopropane, etc.

As before, mixtures are available commercially, usually at lower prices, of suitable compounds of this class and advantageously are used for the purposes of the present invention. One such mixture is "Duomeen T" which is N-tallow-1,3-diaminopropane and predominates in alkyl groups containing from 16 to 18 carbon atoms each, although the mixture contains a small amount of alkyl groups containing 14 carbon atoms each. Another mixture available commercially is N-coco-1,3-diaminopropane which contains alkyl groups predominating in 12 to 14 carbon atoms each. Still another example is N-soya-1,3-diaminopropane which predominates in alkyl groups containing 18 carbon atoms per group, although it contains a small amount of alkyl groups having 16 carbon atoms. However, such mixtures can be used only if they do not contain a branched chain configuration in proximity to the nitrogen atoms, as hereinbefore set forth.

While the N-alkyl-1,3-diaminopropanes are preferred compounds of this class, it is understood that suitable N-alkyl ethylene diamines,
N-alkyl-1,3-diaminobutanes,
N-alkyl-1,4-diaminobutanes,
N-alkyl-1,3-diaminopentanes,
N-alkyl-1,4-diaminopentanes,
N-alkyl-1,5-diaminopentanes,
N-alkyl-1,3-diaminohexanes,
N-alkyl-1,4-diaminohexanes,
N-alkyl-1,5-diaminohexanes,
N-alkyl-1,6-diaminohexanes, etc.

may be employed, but not necessarily with equivalent results. Also, it is understood that polyamines containing 3 or more nitrogen atoms may be employed provided they meet the requirements hereinbefore set forth. Illustrative examples of such compounds include N-dodecyl-diethylene triamine, N-tridecyldiethylene triamine, N-tetradecyl-diethylene triamine, etc., N-dodecyl-dipropylene triamine, N-tridecyl-dipropylene triamine, N-tetradecyl-dipropylene triamine, etc., N-dodecyldibutylene triamine, N-tridecyl-dibutylene triamine, N-tetradecyl-dibutylene triamine, etc., N-dodecyl-triethylene tetramine, N-tridecyl-triethylene tetramine, N-tetradecyl-triethylene tetramine, etc., N-dodecyl-tripropylene tetramine, N-tridecyl-tripropylene tetramine, N-tetradecyl-tripropylene tetramine, etc., N-dodecyl-tributylene tetramine, N-tridecyl-tributylene tetramine, N-tetradecyl-tributylene tetramine, etc., N-dodecyl-tetraethylene pentamine, N-tridecyl-tetraethylene pentamine, N-tetradecyl-tetraethylene pentamine, etc., N-dodecyl-tetrapropylene pentamine, N-tridecyl-tetrapropylene pentamine, N-tetradecyl-tetrapropylene pentamine, etc., N-dodecyl-tetrabutylene pentamine, N-tridecyl-tetrabutylene pentamine, N-tetradecyl-tetrabutylene pentamine, etc.

In another embodiment, polyaminoalkanes meeting the requirements hereinbefore set forth may be employed but generally such materials are not available commercially and, therefore, are not preferred. Illustrative examples of such compounds include 1,12-diaminododecane, 1,13-diaminotridecane, 1,14-diaminotetradecane, etc.

In general, it is preferred that the amine compound is a saturated compound and does not contain double bonds in the chain. However, in some cases, unsaturated compounds may be employed, provided they meet the other requirements hereinbefore set forth, although not necessarily with equivalent results. Such amine compounds may be prepared from unsaturated fatty acids and, therefore, may be available commercially at lower cost. Illustrative examples of such amine compounds include dodecylenic amine, didodecylenic amine, N-dodecylenic ethylene diamine, N-dodecylenic-1,3-diaminopropane, oleic amine, dioleic amine, N-oleic ethylene diamine, N-oleic-1,3-diaminopropane, linoleic amine, dilinoleic amine, N-linoleic ethylene diamine, N-linoleic-1,3-diaminopropane, etc. It is understood that these amine compounds are included in the present specifications and claims by reference to amine, amine compounds or amino compounds.

In accordance with the present invention, the intermediate reaction product formed by the reaction of the amino compound and epihalohydrin compound is subsequently reacted with an alkylene polyamine. Any suitable alkylene polyamine may be used and must contain at least one primary or secondary amino group. In one embodiment, the alkylene polyamine is selected from the group including ethylene diamine, diethylene triamine, triethylene tetramine, tetraethylene pentamine, etc., propylene diamine, dipropylene triamine, tripropylene tetramine, tetrapropylene pentamine, etc., butylene diamine, dibutylene triamine, tributylene tetramine, tetrabutylene pentamine, pentylene diamine, dipentylene triamine, tripentylene tetramine, tetrapentylene pentamine, etc. It will be noted that, in the above alkylene polyamines, the nitrogen atoms are attached to adjacent carbon atoms. Also included are alkylene polyamines in which the nitrogen atoms are separated by 3, 4, 5 or more carbon atoms. The latter compounds more conveniently are named as diaminoalkanes but are included, in the present specifications and claims, as alkylene polyamines. Illustrative alkylene polyamines in this class are 1,3-diaminopropane, 1,3-diaminobutane, 1,4-diaminobutane, 1,3-diaminopentane, 1,4-diaminopentane, 1,5-diaminopentane, etc. and similarly for the polyaminoalkanes in which the nitrogen atoms are separated by 3 or more carbon atoms.

Also included in the alkylene polyamines are the N-alkyl-1,3-diaminopropanes and similarly substituted N-alkyl-ethylene diamines, N-alkyl-1,3-diaminobutanes, N-alkyl-1,4-diaminobutanes, N - alkyl-1,3-diaminopentanes, N-alkyl - 1,4 - diaminopentanes, N - alkyl-1,5-diaminopentanes, N-alkyl - 1,3 - diaminohexanes, N-alkyl-1,4-diaminohexanes, N-alkyl-1,5-diaminohexanes, N-alkyl-1,6-diaminohexanes, etc., including particularly the specific compounds hereinbefore set forth in connection with the first step of the process. In general it is preferred that, when it is desired to use N-alkyl diaminoalkanes in both steps of the process, different N-alkyl diaminoalkanes are used in each step thereof.

As hereinbefore set forth, the amine compound is reacted with an epihalohydrin compound in the first step of the process. Epichlorohydrin is preferred. Other epichlorohydrin compounds include 1,2-epoxy-4-chlorobutane, 2,3-epoxy-4-chlorobutane, 1,2-epoxy-5-chloropentane, 2,3-epoxy-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent in the same or different substrates and that, as hereinbefore set forth, epichlorohydrin is preferred.

In general 1 mol proportion of the amine compound is reacted with 1, 2 or 3 mol proportions of the epihalohydrin compound in the first step of the process although, in some cases, additional epihalohydrin compound may be used up to a maximum of 1 mol proportion thereof per each amino hydrogen in the particular amino compound used in preparing the intermediate reaction product. For example, when using tallow amine, 1 or 2 mol proportions of epichlorohydrin may be reacted with 1 mol proportion of tallow amine. Similarly, when using N-tallow-1,3-diaminopropane, 1, 2 or 3 mol proportions of epichlorohydrin may be reacted with 1 mol proportion of N-tallow-1,3-diaminopropane.

In the second step of the process the intermediate reaction product prepared in the above manner is reacted with an alkylene polyamine. When the intermediate product contains 1 mol proportion of available halogen, the intermediate product is reacted with 1 mol proportion or less, preferably not less than 0.25 mol proportion, of alkylene polyamine. In this embodiment, the intermediate product has only one reactive site (halogen). Thus, up to 4 mol proportions of the intermediate product may react with 1 mol proportion of the alkylene polyamine. It will be seen that this is a concluding reaction and does not proceed to polymer formation. In another embodiment the intermediate product contains 2 or more reactive sites (halogens) and is reacted with 1 mol proportion of alkylene polyamine per mol proportion of available halogen.

As hereinbefore set forth, the alkyl amine is first reacted with the epihalohydrin compound and then this intermediate reaction product is subsequently reacted with the alkylene polyamine. The first reaction is effected in any suitable manner and may be completed in one step or preferably in a series of steps. For example, the epihalohydrin compound is supplied to a reaction zone and the amino compound is introduced thereto gradually, with stirring. In some cases the reverse procedure may be used; that is, in which the epihalohydrin compound is added gradually, with stirring, to the amino compound. Generally it is preferred to utilize a solvent and, in the preferred embodiment, a solution of the alkyl amine in a solvent and a separate solution of the epihalohydrin compound in a solvent are prepared, and these solutions then are commingled in the manner hereinbefore set forth. Any suitable solvent may be employed, a particularly suitable solvent comprising an alcohol including ethanol, propanol, butanol, etc., 2-propanol being particularly desirable. These solvents may be used alone or along with aromatic hydrocarbons such as benzene, toluene, xylene, ethylbenzene, cumene, etc., or naphtha, Decalin, etc.

Following the reaction of the primary amine with the epihalohydrin compound, the intermediate product is reacted with an alkylene polyamine in the same or different reaction zone, with or without intervening further treatment of the intermediate reaction product. In a preferred embodiment, the intermediate reaction product is added gradually to a refluxing or heated and stirred solution of the alkylene polyamine. While the reverse procedure may be used; that is, adding the alkylene polyamine to the heated and stirred solution of the intermediate reaction product, it is preferred to add the intermediate product to the alkylene polyamine in order to minimize polymer formation. It is understood that the alkylene polyamine may be prepared as a solution in a suitable solvent, when desired, and the solvent preferably is selected from those hereinbefore set forth in connection with the description of the reactants used in the first step of the process.

The reaction is effected at any suitable temperature. The reaction of the amine and epihalohydrin generally will be effected in the range of from about 20° to about 80° C. and preferably of from about 50° to about 75° C. The temperature and time in this step of the process is selected so that polymer formation is minimized. This is readily accomplished by maintaining the temperature below about 80° C. and the time of reaction to not greater than about 4 hours and generally of from about 1 to about 3 hours. After the first reaction is completed, the reaction of the alkylene polyamine with the intermediate reaction product is effected at a higher temperature, which generally will be within the range of from about 75° to about 100° C. and preferably of from about 85° to about 95° C. The time of reaction generally will be less than 4 hours and preferably from about 1 to about 3 hours, although longer times up to 10 hours or more may be employed when of advantage to do so.

Either before or after the removal of the final reaction product from the reaction zone, this product is treated to remove halogen, generally in the form of an inorganic halide salt as, for example, the hydrogen halide salt. This may be effected in any suitable manner and generally is accomplished by reacting the product with a strong inorganic base such as sodium hydroxide, potassium hydroxide, sodium carbonate, potassium carbonate, etc., to form the corresponding metal halide. The reaction to form the metal halide generally is effected under the same conditions as hereinbefore set forth, usually at a temperature of from about 50° to about 100° C. After this reaction is completed, the metal halide is removed in any suitable manner, including filtering, centrifugal separation, etc. It is understood that the reaction product also is heated sufficiently to remove alcohol and water and this may be effected either before or after the treatment to remove the inorganic halide.

It is believed that the reaction proceeds according to the following mechanism, although applicant does not intend to be limited thereto. The epoxy group of the epihalohydrin compound reacts in equal mol proportions with the secondary amine or in 1 and/or 2 mol proportions with 1 mol proportion of the primary amine. With polyamines, the epihalohydrin compound may react in a proportion up to a maximum equal to 1 thereof per amino hydrogens in the polyamine. Preferably the concentration of epihalohydrin is limited to not more than 3 mol proportions thereof per mol proportion of polyamine. The intermediate reaction product has an available halogen per each mol proportion of reacted epihalohydrin and this halogen reacts with an amino hydrogen of the alkylene polyamine to form the corresponding hydrogen halide, which later is removed by reaction with the inorganic base as hereinbefore set forth. It will be noted that the reaction of the amino hydrogen of the alkylene polyamine with the available halogen is a concluding reaction under the conditions employed. Accordingly, further reaction to form polymers or other heavier products is minimized.

The reaction products prepared in the above manner are new compositions of matter and possess unexpected properties over related but different compositions of matter of the prior art. In general, the reaction product comprises a mixture of different compounds, which mixture will predominate in compounds having N-alkyl and N'-alkylene polyamine configurations attached at the opposite ends thereof. Another advantage to the present invention is that the mixture of compounds prepared in the above manner may be utilized without the added expense and time of separating a specific compound from the mixture. The reaction products will range from liquids to solids and, when desired, may be prepared as a solution in a suitable solvent for ease of handling and using. One or a mixture of the solvents hereinbefore set forth is preferred.

The reaction products of the present invention will have varied utility and are particularly advantageous for use as an additive in burner oil. The term "burner oil" is used in the present specifications and claims to include hydrocarbon distillates boiling within the range of from about 300° F. to about 750° F. These burner oils are marketed under various trade names such as burner oil, fuel oil, furnace oil, diesel oil, etc., and are used principally in burner systems, diesel and combustion engines, and various other industrial and domestic equipment. Also specifically included in this classification are jet fuels or other hydrocarbon distillates containing components boiling within the range hereinbefore set forth and also containing lower boiling components. Jet fuels, for example, may have an initial boiling point as low as about 60° F. and an end boiling point within the range of from about 450° F. to about 600° F. or higher.

In storage the burner oil undergoes deterioration, with the formation of sediment, undesired discoloration, etc. The formation of sediment is objectionable because the sediment tends to plug strainers, burner tips, injectors, etc., and, when used as diesel fuel, tends to form varnish and sludge in the diesel engine. Discoloration of burner oils is objectionable for various reasons, including the customers' preference for light colored oils. Deterioration of jet fuel and burner oil at high temperature also is a serious problem. For example, jet fuel is passed into indirect heat exchange with hot products, and deterioration of the jet fuel results in plugging of the exchanger coils.

Burner oils present a difficult problem because of the wide variations in stability, apparently due to the many different sources from which burner oils are obtained. The formation of sediment and discoloration in storage vary considerably with the geographic source of the burner oil and with the treatment that the burner oil has received at the refinery. At present burner oils come principally from non-destructive distillation of petroleum oil and are commonly referred to in the art as straight run distillate, and from non-catalytic and catalytic cracking processes and are commonly referred to in the art as cycle stocks, the latter term being used because the burner oil is separated from a fraction which otherwise would be recycled to the cracking process for further conversion therein. Other sources of burner oils may include those produced by the reaction of carbon monoxide with hydrogen, in such processes as the Fischer-Tropsch process, Synthesis process, Oxo process, etc. The stability problems of burner oils become complicated further when the burner oil comprises a blend of two or more different oils.

While the improvement desired in burner oils may take the form of reduced sediment formation, retarded discoloration, etc. as hereinbefore set forth, satisfactory improvement also may be obtained in a somewhat different manner. One of the primary objectives is that the burner oil will not clog strainers, burner tips, injectors, etc., as hereinbefore set forth, and this objective also may be attained by suitably dispersing the particles in the burner oil so that they will be small enough to pass through said restricted zones without clogging thereof. Therefore, while the actual sediment content may be the same or larger, it is present in such a finely divided form that the burner oil may be used satisfactorily without experiencing clogging difficulties.

In addition to the above use, the novel reaction product of the present invention also may be employed as an additive to prevent deposit formation in heat exchangers through which 2 different fluids are passed at different temperatures into indirect heat exchange with each other. The novel additive of the present invention serves to retard deposit formation in the heat exchanger, particularly at the hotter portions thereof, and thereby serves to considerably prolong the continuous operation of the process. The additive also may be used in other applications to prevent sediment formation in hydrocarbon oils and/or to serve as a dispersant additive to prevent settling out of particles.

The reaction product of the present invention is incorporated in the burner oil or other substrate in a stabilizing concentration which generally will be below about 1% by weight and usually in a concentration within the range of from about 0.0001% to about 1% by weight. When used to prevent heat exchanger deposits and in some other applications, the additive may be used in a concentration of from about 1 to 500 parts by weight per million and preferably from about 5 to 100 parts per million. It is understood that this additive may be used in conjunction with other additives, such as metal deactivators, anti-oxidants, synergists, cetane improvers, rust inhibitors, etc. Furthermore, it is understood that the additive may be prepared as a solution in a suitable solvent. In some cases, one or more of the other additives to be incorporated in burner oil will be prepared as a solution in the solvent and, when desired, the additive of the present invention may be prepared as a mixture with one or more other additives, preferably as a solution in a suitable solvent, and the same marketed as a single commodity of multiple purposes.

The following examples are introduced to illustrate further the novelty and utility of the present invention but not with the intention of unduly limiting the same.

EXAMPLE I

The reaction product of this example was prepared by reacting 1 mol of a mixture of di-(octadecyl) amine and di-(hexadecyl) amine (Armeen 2HT) with 1 mol of epichlorohydrin and then the product was further reacted with 0.5 mol of ethylene diamine. In the first step of the process the amine mixture was prepared as a dilute solution in 2-propanol. Epichlorohydrin was separately prepared as a solution in 2-propanol. The solution of the mixed amines was supplied to a reaction zone and heated, with stirring, to 60–65° C. One mol of the epichlorohydrin solution was added gradually over a period of 30 minutes, with stirring, to the amine solution and reacted at 60–65° C. for an additional 2 hours. After the reaction was completed, the entire solution was removed from the reaction zone and was added gradually to a refluxing solution of 0.5 mol of ethylene diamine. Subsequently, 1 mol of sodium hydroxide was added to the mixture and the heating and stirring continued. Upon completion of the reaction, the mixture was filtered hot to remove sodium chloride and the filtrate was allowed to cool. A precipitate separated out, was filtered off and dried to remove adhering solvents. The final reaction product was a pale yellow, soft, waxy solid melting at 30–32° C. to a pale yellow liquid which, upon heating to about 70° C., clears to a transparent liquid. It is soluble in benzene, toluene, 2-propanol, hot ethanol, etc.

The reaction product prepared in the above manner was tested in a method referred to as the "Erdco Test." In this method, heated oil is passed through a filter, and the time required to develop a differential pressure across the filter of 25 in. Hg is determined. It is apparent that the longer the time, the more effective is the additive. However, with a very effective additive, the time to reach a differential pressure across the filter of 25 in. Hg is lengthened beyond reasonable limits that the test is stopped after about 300 minutes and the differential pressure at that time is reported.

0.001% by weight of the reaction product prepared in the above manner was incorporated in a sample of commercial range oil and evaluated in the "Erdco Test." After 300 minutes, the differential pressure across the filter was only 0.3 in. Hg. On the other hand, a control sample (not containing an additive) reached a differential pressure across the filter of 25 in. Hg in about 120 minutes.

EXAMPLE II

As hereinbefore set forth, stability problems of different burner oils vary considerably. In the present example, a burner oil comprising a blend of 85% commercial fuel oil and 15% cracked gasoline was employed. When run in the Erdco Test, this oil developed a differential pressure of 25 in. Hg in about 50 minutes. It will be noted that this blended burner oil is of considerably poorer stability than the range oil used in the previous example.

Another sample of the additive, prepared as described in Example I, was tested in this burner oil. The additive was used in a concentration of 0.001% by weight. This run was discontinued after 180 minutes. The sample of burner oil containing the additive prepared in the above manner developed only 0.3 in. Hg after 180 minutes. On the other hand, the control sample (not containing an additive) of the burner oil developed a differential pressure of 25 in. Hg in about 50 minutes.

EXAMPLE III

The reaction product of this example was prepared by reacting 1 mol of hydrogenated tallow amine (Armeen HTD) with 1 mol of epichlorohydrin and further reacting with 0.5 mol of tetraethylene pentamine. It will be noted that tallow amine is a mixture of primary amines predominating in 16 to 18 carbon atoms per alkyl group. All of the reactants were prepared as separate solutions in 2-propanol. The hydrogenated tallow amine solution was supplied to a reaction zone and heated, with stirring, to 60–65° C. The epichlorohydrin solution was added gradually, with stirring, to the tallow amine solution and reacted at 60–65° C. After the reaction was completed, the entire solution was removed from the reaction zone and was added gradually to a refluxing solution of the tetraethylene pentamine. Subsequently 1 mol of sodium hydroxide was added to the mixture and the heating and stirring were continued. Following completion of the reaction, the mixture was filtered, the filtrate cooled and the precipitate dried to remove adhering solvent. The product was recovered as a yellow glassy solid.

The product prepared in the above manner was evaluated in another sample of the burner oil described in Example II. The sample of burner oil containing 0.001% by weight of the above additive developed a differential pressure of only 0.7 in. Hg after 180 minutes. On the other hand, a control sample (not containing an additive) of the burner oil developed a differential pressure of 25 in. Hg in about 50 minutes.

EXAMPLE IV

The preparation of this example is similar to that described in Example III except that 1 mol of tetraethylene pentamine was utilized instead of 0.5 mol described in Example II. The product of this preparation was recovered as a dark yellow sticky solid.

When evaluated in another sample of the burner oil described in Example II, the sample of burner oil containing 0.001% by weight of the additive prepared in this example developed a differential pressure of only 0.9 in. Hg after 180 minutes. It will be remembered that a control sample (not containing an additive) of the burner oil developed a pressure of 25 in. Hg in about 50 minutes.

EXAMPLE V

In another method of evaluating the additives, samples of a No. 2 commercial fuel oil were stored at 100° F. for about 45 days and the mg./100 ml. of sediment was determined after such storage. The first sample was a control sample and did not contain an additive. The second sample contained 0.01% by weight of the additive of Example III, the third sample contained 0.01% by weight of the additive described in Example IV. The results of these evaluations are reported in the following table:

*Table I*

| Compound | Days Stored | Mg./100 ml. |
|---|---|---|
| None | 43 | 8.7 |
| Example III | 46 | 0.3 |
| Example IV | 45 | 0.5 |

From the data in the above table, it will be noted that the additives considerably reduced sediment formation.

EXAMPLE VI

This example describes the preparation formed by reacting 1 mol of hydrogenated tallow amine (Armeen HTD) with 1 mol of epichlorohydrin and then further reacting with 0.33 mol of tetraethylene pentamine. This preparation was made in substantially the same manner as hereinbefore described in Example III.

The additive prepared in the above manner was evaluated in a different fuel oil. This fuel oil was a blend of 65% range oil and 35% catalytically cracked cycle oil. A control sample (not containing an additive) of this fuel oil developed a differential pressure of 25 in. Hg after about 55 minutes. In contrast, a sample of the fuel oil containing 0.0001% by weight of the additive prepared in the above manner developed a differential pressure of only 1.5 in. Hg. after 180 minutes. It will be noted that this additive was used in a very low concentration and yet was effective to considerably retard deterioration of the fuel oil.

EXAMPLE VII

The reaction product of this example is prepared by reacting 1 mol proportion of Duomeen T with 1 mol proportion of epichlorhydrin and then reacting with 0.5 mol proportion of ethylene diamine. It will be noted that Duomeen T is N-tallow-1,3-diaminopropane and predominates in alkyl groups containing from 16 to 18 carbon atoms each. This preparation was made in substantially the same manner as described in the previous examples.

The additive prepared in the above manner was evaluated in a different fuel oil, which fuel oil developed a differential pressure of about 25 in. Hg in about 55 minutes. When evaluated in the Erdco Test, a sample of the fuel oil containing 0.0001% by weight of the additive prepared in the above manner developed a differential pressure of only 0.3 in. Hg after 180 minutes. Here again it will be noted that the additive was very effective in the exceedingly low concentrations.

EXAMPLE VIII

This example describes the preparation formed by reacting 1 mol of hydrogenated tallow amine with 1 mol of epichlorohydrin and then further reacting with 1 mol of Duomeen T. As hereinbefore described, Duomeen T is N-tallow-1,3-diaminopropane and predominates in alkyl groups containing from 16 to 18 carbon atoms each. The reaction is effected in the same manner as hereinbefore described, including the removal of the halogen by reacting with 1 mol of sodium hydroxide.

The product recovered in the above manner is used as an additive in a concentration of 0.0005% by weight in a commercial fuel oil. When evaluated in the Erdco Test, the differential across the filter is considerably reduced in comparison to a differential pressure of 25 in. Hg developed in about 60 minutes in the sample of fuel oil not containing an additive.

I claim as my invention:

1. The reaction product formed by first reacting at a temperature of from about 20° to about 80° C. and for a time period of from about 1 to about 4 hours one mol proportion of an aliphatic amine consisting of carbon, hydrogen and nitrogen and containing from 12 to 40 carbon atoms and a straight chain of at least 3 carbon atoms attached to a nitrogen atom and having at least one hydrogen atom attached to the nitrogen atom, with from 1 to 3 mol proportions of an epihalohydrin compound selected from the group consisting of epichlorohydrin, 1,2-epoxy-4-chlorobutane, 2,3-epoxy-4-chlorobutane, 1,2-epoxy-5-chloropentane and 2,3-epoxy-5-chloropentane, subsequently reacting the resultant reaction product at a temperature of from about 75° to about 100° C. and for a time period of from about 1 to about 10 hours with from 0.25 to 2 mol proportions of an alkylene polyamine consisting of carbon, hydrogen and nitrogen, and reacting the product of the last-mentioned step with an inorganic base at a temperature of from about 50° to about 100° C. to remove halogen therefrom.

2. The reaction product formed by first reacting one mol proportion of tallow amine with from 1 to 3 mol proportions of epichlorohydrin at a temperature of from about 50° to about 75° C. and for a time period of from about 1 to about 4 hours, subsequently reacting the resultant reaction product with from 0.25 to 2 mol proportions of ethylene diamine at a temperature of from about 85° to about 95° C. and for a time period of from about 1 to about 10 hours, and reacting the product of the last-mentioned step with sodium hydroxide at a temperature of from about 50° to about 100° C. to remove chlorine therefrom.

3. The reaction product formed by first reacting one mol proportion of tallow amine with from 1 to 3 mol proportions of epichlorohydrin at a temperature of from about 50° to about 75° C. and for a time period of from about 1 to about 4 hours, subsequently reacting the resultant reaction product with from 0.25 to 2 mol proportions of tetraethylene pentamine at a temperature of from about 85° to about 95° C. and for a time period of from about 1 to about 10 hours, and reacting the product of the last-mentioned step with sodium hydroxide at a temperature from about 50° to about 100° C. to remove chlorine therefrom.

4. The reaction product formed by first reacting one mol proportion of tallow amine with from 1 to 3 mol proportions of epichlorohydrin at a temperature of from about 50° to about 75° C. and for a time period of from about 1 to about 4 hours, subsequently reacting the resultant reaction product with from 0.25 to 2 mol proportions of N-tallow-1,3-diaminopropane at a temperature of from about 85° to about 95° C. and for a time period of from about 1 to about 10 hours, and reacting the product of the last-mentioned step with sodium hydroxide at a temperature of from about 50° to about 100° C. to remove chlorine therefrom.

5. The reaction product formed by first reacting one mol proportion of di-(octadecyl) amine with from 1 to 3 mol proportions of epichlorohydrin at a temperature of from about 50° to about 75° C. and for a time period of from about 1 to about 4 hours, subsequently reacting the resultant reaction product with from 0.25 to 2 mol proportions of ethylene diamine at a temperature of from about 85° to about 95° C. and for a time period of from about 1 to about 10 hours, and reacting the product of the last-mentioned step with sodium hydroxide at a temperature of from about 50° to about 100° C. to remove chlorine therefrom.

6. The reaction product formed by first reacting one mol proportion of di-(hexadecyl) amine with from 1 to 3 mol proportions of epichlorohydrin at a temperature of from about 50° to about 75° C. and for a time period of from about 1 to about 4 hours, subsequently reacting the resultant reaction product with from 0.25 to 2 mol proportions of ethylene diamine at a temperature of from about 85° to about 95° C. and for a time period of from about 1 to about 10 hours, and reacting the product of the last-mentioned step with sodium hydroxide at a temperature of from about 50° to about 100° C. to remove chorine therefrom.

References Cited in the file of this patent

UNITED STATES PATENTS

| | | |
|---|---|---|
| 1,845,403 | Eisleb | Feb. 16, 1932 |
| 2,694,629 | Reynolds | Nov. 16, 1954 |
| 2,708,666 | Carpenter | May 17, 1955 |